Feb. 13, 1951     E. T. JAYNES     2,541,066
OBJECT DETECTING AND WARNING SYSTEM AND METHOD
Filed Nov. 24, 1943
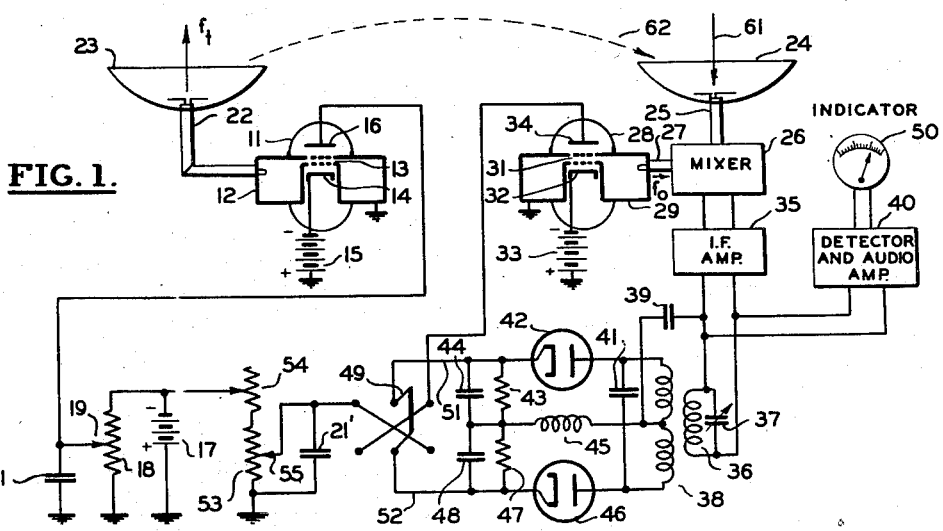
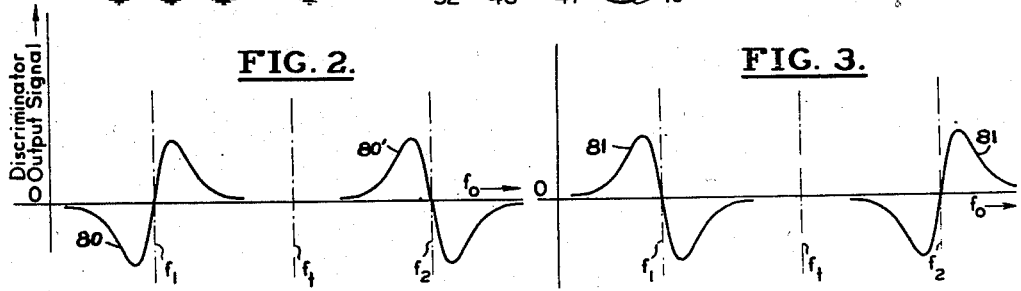
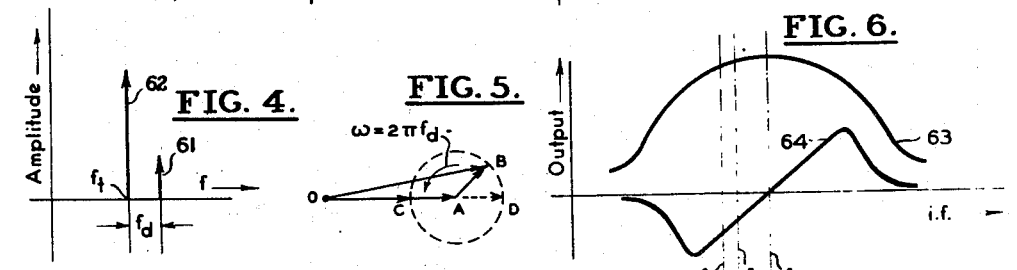
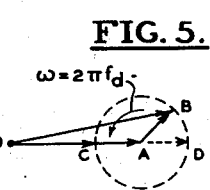
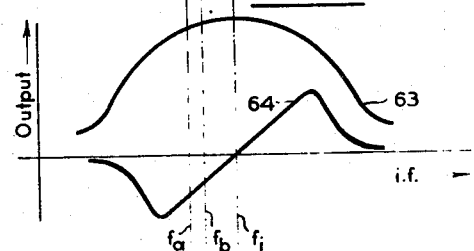
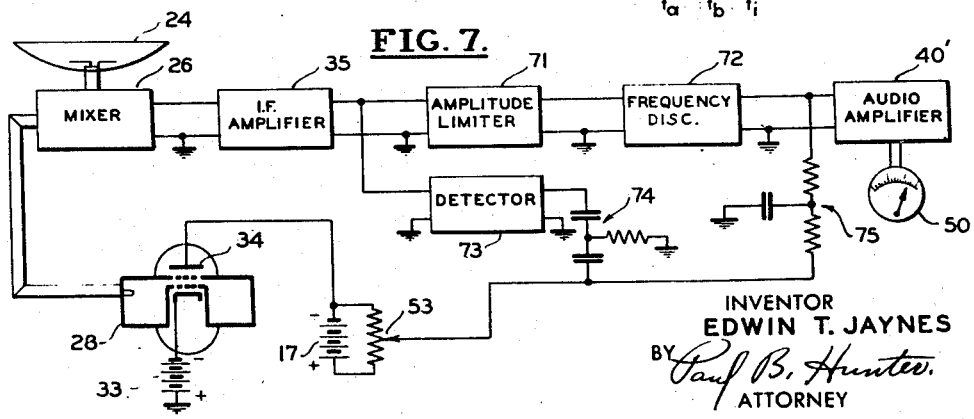
INVENTOR
EDWIN T. JAYNES
BY Paul B. Hunter
ATTORNEY Patented Feb. 13, 1951

2,541,066

UNITED STATES PATENT OFFICE 2,541,066

OBJECT DETECTING AND WARNING SYSTEM AND METHOD

Edwin T. Jaynes, Garden City, N. Y., assignor to The Sperry Corporation, a corporation of Delaware Application November 24, 1943, Serial No. 511,520

20 Claims. (Cl. 343—8)

The present invention is directed to the art including object detecting and warning systems and methods useful in object detection and warning. In prior art types of such systems, it has been known to radiate a high frequency electromagnetic wave and to receive energy reflected by a distant object, such reflected energy serving to indicate the presence of this object. It is also known to detect the presence of moving objects only by indicating the frequency change in the received reflected energy due to the well known Doppler effect.

In the systems of this general type, and especially of the last-mentioned type, the received energy is relatively very weak in comparison with the radiated energy, and may represent a very small percentage modulation on energy received directly from the radiator. Such weak received wave and low percentage modulation render it difficult to produce highly sensitive indications. According to the present invention, this percentage modulation, especially in Doppler warning systems, is materially increased by the use of a special type of regenerative action. The principle of the present invention, however, is not restricted to Doppler warning systems but may be used generally, especially where it is desirable to increase the percentage modulation or indicated modulation signal of a modulated wave.

According to another aspect of the present invention, improved automatic frequency control systems for ultra high frequency oscillators are disclosed, especially of the type disclosed in Fig. 2 of Varian and Hansen Patent No. 2,250,511, issued July 29, 1941, which oscillators have come to be known commercially as "reflex klystrons," one type of which bears the RMA designation 2K37 or 2K39.

Such tubes have wide usage as local oscillators in superheterodyne receiver systems operating in the microwave or hyper-frequency range of the order of 1000 megacycles per second or higher. Such oscillators include a cavity resonator through which an electron beam is passed, the beam being reflected by a suitable reflector electrode so as to reenter the resonator and excite oscillations therein. The output frequency of such an oscillator may be controlled either by tuning the resonator or by adjusting the reflecting voltage applied to the reflector electrode.

According to the present invention, an automatic frequency control system for such "reflex klystron" oscillators is provided, in which a control voltage corresponding to frequency deviation of the oscillator from the desired local oscillator frequency value is impressed on the reflector electrode of the oscillator so as to restore its output frequency to its desired or normal value, which is usually the value differing from the received carrier wave by the amount of the desired intermediate frequency.

According to the present invention also, means are provided to manually adjust the local oscillator frequency to its normal value and also to tune the oscillator so as to bring it within the range of control of the automatic frequency control system.

A further feature of the present invention is the provision of means for permitting a local oscillator to synchronize or lock-in at a frequency spaced either above or below the received frequency or reference frequency by the amount of the intermediate frequency. This is of great importance, since the tuning range of such oscillators is quite limited, and if it should be found that the local oscillator frequency is on one side of the received frequency, for example, below, it is more advantageous to rearrange the control system to provide automatic frequency control at that frequency rather than to retune the oscillator to the corresponding value above the received wave frequency at which this control system may normally have its automatic control features.

Accordingly it is an object of the present invention to provide improved Doppler warning systems and methods whereby increased sensitivity and range of operation is obtained.

It is another object of the present invention to provide improved systems for changing the percentage modulation of an amplitude-modulated wave by the use of regenerative action. It is a further object of the present invention to operate a superheterodyne receiving system under novel conditions, wherein the intermediate frequency produced is purposely selected and adjusted to be different from the tuned frequency of the intermediate frequency amplifier.

It is a still further object of the present invention to provide improved high frequency systems and methods in which a regenerative action is obtained by converting amplitude variations into corresponding frequency variations which, upon detection, may produce a greatly enhanced indication of the modulation signal of the original amplitude-modulated wave.

It is yet another object of the present invention to provide improved automatic frequency control systems for "reflex klystron" oscillators in which the reflector electrode of such an oscillator is controlled in response to its deviation from a desired output frequency.

It is a further object of the present invention to provide an improved automatic frequency control system for "reflex klystron" oscillators in which means is provided for manually controlling the oscillator frequency in addition to automatic frequency control.

It is still another object of the present invention to provide an improved automatic frequency control system for "reflex klystron" oscillators in which lock-in may be provided selectively on either side of a reference or received frequency.

Other objects and advantages of the present invention will become apparent from the following specification and drawing, wherein Fig. 1 is a schematic wiring diagram illustrating a complete Doppler warning system incorporating features of the present invention;

Figs. 2 and 3 are curves of discriminator output vs. local oscillator frequency, useful in explaining some of the features of the present invention;

Fig. 4 is a frequency-amplitude diagram illustrating the relation between the reflected received wave and the intermediate or leakage wave in the system of Fig. 1;

Fig. 5 is an explanatory vector diagram relating to the input to the receiving system of the invention;

Fig. 6 shows transmission characteristic curves of the intermediate frequency amplifier and of the discriminator of the system of Fig. 1; and Fig. 7 shows a schematic wiring diagram of a system similar to that of Fig. 1 and having further advantages according to the present invention.

In Fig. 1 there is shown a transmitter oscillator 11 which is of the "reflex klystron" type, comprising a resonator 12, through whose electron-permeable grids 13 a beam of electrons is passed from a cathode 14 by means of an accelerating battery 15 connected between the cathode 14 and the grounded resonator 12. This beam of electrons is reversed in its flight and reflected by a reflector electrode 16 as to re-enter the resonator 12 through its grids 13. As is discussed in the above-mentioned Patent No. 2,250,511, by proper selection of the reflector voltage in relation to the cathode voltage and the resonator frequency, stable oscillations can be produced within resonator 12. The voltage for reflector electrode 16 is derived from a reflector electrode voltage source comprising a battery 17 and a voltage divider 18 connected thereacross. A movable tap 19 of voltage divider 18 provides means for adjusting the reflector voltage to a desired value at which oscillations of the desired frequency are produced. A by-pass condenser 21 helps to maintain the reflector electrode voltage constant despite transient variations such as due to internal chemical changes in the battery 17 or noise produced by the resistor 18. The ultra-high frequency energy generated by this transmitter oscillator 11 is then fed by a suitable coupling transmission line 22 to a radiator 23, preferably of a directive type, and is thereby radiated toward the distant object to be detected or located.

Energy reflected by this distant object is received by a similar antenna 24 and is supplied by a coupling line 25 to an ultra-high frequency mixer 26 which may be of any conventional type, such as a crystal mixer. Also supplied to mixer 26 by way of line 27 is the local oscillator frequency wave derived from the local oscillator 28. Local oscillator 28 is also of the "reflex klystron" type disclosed in Fig. 2 of the above-mentioned Patent No. 2,250,511, and has a grounded resonator 29 with grids 31, a reflector electrode 34, and a cathode 32 connected through a battery 33 to ground.

Mixer 26 thus provides an output of a frequency which is the difference between the local oscillator frequency and the transmitted frequency. This will be termed the "intermediate frequency." This intermediate frequency is then suitably amplified in an intermediate frequency amplifier 35 of any conventional type, whose output is supplied to a detector and audio amplifier 40, which in turn actuates a suitable indicator 50 which may be of the visual or audio type, as desired. Intermediate frequency amplifier 35 is of the conventional tuned type having a predetermined band width; that is, it serves to amplify only frequencies within a predetermined range. It is to be noted that the conventional limiter in amplifier 35 is here omitted.

In order to assure that the wave supplied to amplifier 35 will be of a frequency within its range of transmission, the present invention also incorporates an automatic frequency control system. The output of the intermediate frequency amplifier is therefore supplied to a frequency discriminator which is adapted to produce an output unidirectional voltage having a magnitude corresponding to the magnitude of deviation of the intermediate frequency from a desired value, which is preferably that to which the intermediate amplifier 35 is tuned. The output of the discriminator also has a polarity corresponding to the sense of this frequency deviation; that is, for an intermediate frequency greater than the desired value, the output will have a determined polarity; for a deviation in the opposite sense, the discriminator output voltage will have opposite polarity. Thus, the intermediate frequency amplifier 35 contains an output tuned circuit comprising a coil 36 and condenser 37 tuned to the desired intermediate frequency. The coil 36 is magnetically coupled to a center-tapped coil 38 forming the secondary of a transformer 36, 38. A condenser 39 is connected between the high potential end of coil 36 and the center tap of coil 38 and supplies a voltage which is in phase quadrature to the voltage induced in the respective halves of coil 38, when energy of the desired frequency is excited in circuit 36, 37. Coil 38 may also be tuned to the desired intermediate frequency by condenser 41 connected thereacross.

The vector sum of the voltage induced in one half of coil 38 and the voltage supplied by condenser 39 is rectified by a suitable diode rectifier 42 having a load resistor 43 shunted by an intermediate frequency by-pass condenser 44. The direct current circuit of rectifier 42 is completed by a radio frequency choke coil 45 connected between the mid-tap of coil 38 and the other terminal of resistor 43 and condenser 44. Choke coil 45 therefore provides a direct current return while maintaining the intermediate frequency isolation necessary. Similarly, the vector sum of the voltage induced in the lower half of coil 38 and the voltage supplied by condenser 39 is rectified in the diode rectifier 46 having a load resistor 47 with an intermediate frequency by-pass condenser 48.

When the actual intermediate frequency is exactly equal to the desired intermediate frequency, the resultant voltages supplied to the diodes 42 and 46 will be equal, producing equal unidirectional voltages across resistors 43 and 47. The resultant voltage appearing across leads 51 and 52 will then be zero, since the voltages across resistors 43 and 47 oppose one another. Upon deviation of the intermediate frequency in one sense from the desired value, the voltage across resistor 43 will become greater than that across resistor 47, producing a net output voltage across leads 51 and 52 of a predetermined polarity and of a magnitude substantially proportional to the frequency deviation. For a deviation of the actual intermediate frequency in opposite sense from the desired value, the voltage across resistor 47 will be greater than that across resistor 43, producing a unidirectional output voltage across leads 51 and 52 of opposite polarity but again substantially proportional to the frequency deviation.

This discriminator output voltage appearing between leads 51 and 52 is connected to the central terminals of a double-pole, double-throw switch 49 which serves as a reversing switch and connects the discriminator output voltage in series with a voltage derived from a voltage divider 53 connected across battery 17. This series voltage is then impressed upon the reflector electrode 34 of the local oscillator 28 to control the frequency of the local oscillator 28.

When the switch 49 is thrown to the right, the reflector electrode 34 is connected to lead 51 while lead 52 is connected to a movable tap 55 of a voltage divider 53 which in turn is connected in series with a rheostat 54 across battery 17. On the other hand, when the switch 49 is thrown to the left, an electrical circuit is made from electrode 34 first through resistor 47, next through resistor 43, and thence to tap 55. Adjustment of the rheostat 54, which preferably has a resistance of a smaller order of magnitude than that of divider 53, serves as a fine or vernier control for the voltage derived from the movable tap 55 of divider 53. Adjustment of tap 55 or of rheostat 54, or both, serves to adjust the normal operating voltage applied to reflector electrode 34 and, correspondingly, adjusts the frequency of oscillator 28. In this way, the oscillator frequency may be adjusted to the normal value at which the desired intermediate frequency is produced. Upon deviation of the actual intermediate frequency from this desired value, either by a shift in the local oscillator frequency or a shift in the transmitter frequency, an output control voltage is produced from the discriminator which modifies the voltage to reflector electrode 34 of local oscillator 28 to restore the local oscillator frequency to a value yielding the desired intermediate frequency.

The reversing switch 49 permits the control action of the automatic frequency control system to be centered about a local oscillator frequency either above or below the transmitter frequency. This is illustrated in Fig. 2, which shows a graph 80, 80' of the discriminator output signal as a function of the local oscillator frequency $f_0$. Fig. 2 shows the transmitter frequency $f_t$ and the two frequencies $f_1$ and $f_2$ displaced from the frequency $f_t$ by the magnitude of the desired intermediate frequency, so that these values of the local oscillator frequency will produce the desired intermediate frequency. For an actual intermediate frequency greater than the desired value, which occurs when the local oscillator frequency $f_0$ is either less than $f_1$ or greater than $f_2$, the discriminator output has a negative polarity. For an intermediate frequency below the desired value, which corresponds to a local oscillator frequency between $f_1$ and $f_2$, the discriminator output is positive.

In the operation of the oscillator 28, a more negative voltage applied to the reflector 34 will tend to increase the frequency output, while a more positive reflector voltage decreases the frequency output. Accordingly, assuming switch 49 is thrown to the right, as the local oscillator frequency increases from a value below $f_1$, curve 80 shows that the discriminator output is first negative, which increases the net negative voltage on reflector 34 and tends to increase the oscillator frequency further. This tendency causes the local oscillator frequency immediately to synchronize to the frequency $f_1$, since the increase in frequency caused by the increase in negative reflector voltage produces a further increase in negative voltage, carrying the frequency upward until $f_1$ is reached. At the value $f_1$, however, the discriminator output reverses polarity, and now any tendency to increase frequency of the local oscillator is opposed by the change in reflector voltage tending to decrease this frequency. Correspondingly, any decrease in local oscillator frequency below the value $f_1$ will tend to increase its frequency so that stable output frequency is produced at the frequency $f_1$.

Under these conditions operation at the frequency $f_2$ is unstable as is shown by curve 80', since any increase in local oscillator frequency from $f_2$ will produce a negative discriminator output which increases the negative reflector voltage and further increases the oscillator frequency. Also, any decrease in the local oscillator frequency from the value $f_2$ produces a positive discriminator output which decreases the negative voltage on the reflector electrode 34 and further decreases the oscillator frequency. Accordingly, stable operation can be effected only at $f_1$, with the right position of switch 49.

If it should happen that, upon beginning operation in this system, the local oscillator frequency is at or near the frequency $f_2$, it must be returned to the frequency $f_1$ before stable control can be obtained. However, the range of tuning or change in frequency which can be performed in devices of the present type merely by change in the reflector voltage is quite limited, and in some conditions may not permit a change in local oscillator frequency from $f_2$ to $f_1$ by adjusting the voltage divider 55 or rheostat 54. For this reason, switch 49 is utilized to reverse the polarity of the discriminator output voltage as applied to the reflector 34. In effect, the curves 80, 80' shown in Fig. 2 are transformed to curves 81, 81' respectively, as shown in Fig. 3, that is, are reversed with respect to the zero axis. Now referring to curve 81', with the local oscillator at the frequency $f_2$, any tendency to increase frequency produces a positive discriminator output voltage which decreases the negative potential applied to reflector 34 and tends to decrease the local oscillator frequency. Similarly, any decrease in local oscillator frequency produces a negative control voltage which increases the negative reflector voltage and tends to increase the frequency. Thus, stable operation is produced at the frequency $f_2$. Under these conditions, however, operation at the frequency $f_1$ is seen from curve 81 to be completely unstable. Accordingly, the reversing switch 49 permits the choice of stable operation either above or below the transmitter frequency $f_t$ by the amount of the desired intermediate frequency.

In this way, I have provided an extremely useful and simple automatic frequency control system especially adapted for "reflex klystron" oscillators, which is simple in initial adjustment and which permits operation either above or below the transmitter frequency.

It is to be noted that the present frequency control system need not be restricted to an object detecting or locating system as illustrated, but may be utilized wherever it is desired to maintain a local oscillator such as 28 in predetermined frequency difference relation to a reference frequency which may, for example, be supplied from a standard source or from a received wave, as in the present instance.

The operation of the warning system of the present invention depends upon the well-known principle that high frequency energy reflected by a moving object will have a frequency shifted with respect to the frequency of the incident wave, by an amount depending upon the velocity of the object toward or away from the source of the incident energy. This frequency shift is known as the "Doppler frequency shift," and the amount of this shift will be hereinafter termed the Doppler frequency. According to the present invention, the energy received by the receiving antenna 24 is a combination of the frequency-shifted energy reflected from the distant object, as indicated by arrow 61 in Fig. 1, and energy received directly from the transmitting antenna 23, which may be termed "leakage energy" and is indicated by arrow 62.

Fig. 4 shows representative relative amplitudes and frequencies of these two waves. Thus, the leakage energy wave 62 is selected or adjusted to have a much higher amplitude than the reflected energy wave 61. These two waves will have a frequency difference $f_d$, which is the Doppler frequency. Since the Doppler frequency shift is quite small, the amplitude of the resultant energy supplied to mixer 26 can be indicated by reference to the vector diagram of Fig. 5. The vector OA represents the leakage energy wave and will have a length proportional to the amplitude of the leakage energy wave 62. The frequency-shifted reflected wave is represented as a vector AB having its origin at the terminus of vector OA. Due to the frequency difference $f_d$ between these two vectors OA and AB, the vector AB will rotate about A as a center at an angular velocity $\omega$ which is equal to $2\pi$ times the Doppler frequency $f_d$. The resultant vector OB represents the instantaneous amplitude of the input to mixer 26, and it will be seen that this vector OB periodically varies between the length OC as a minimum and the length OD as a maximum. This is fully equivalent to an amplitude modulation, so that the wave received by mixer 26 can be considered to be amplitude modulated at the frequency $f_d$ and with a percentage modulation depending upon the relative amplitudes of the leakage energy wave and the reflected energy wave. In practice, this percentage modulation will be very small, and may be of the order of 0.01%. In accordance with well-known superheterodyne receiver operation, this modulation will also exist on the output of the intermediate frequency amplifier 35, and may be detected and amplified by the detector amplifier 40 to actuate the indicator 50, which will thereupon indicate at least the presence of the moving object producing the Doppler frequency shift. In this way the present system operates as a warning system to indicate the presence of such moving objects.

According to an important feature of the present invention the sensitivity of systems of the type just disclosed is greatly enhanced by a type of regenerative action which will now be described with respect to Fig. 6. In this figure, curve 63 shows the frequency characteristic of the intermediate frequency amplifier 35; that is, for a constant amplitude input to this amplifier, curve 63 indicates by its ordinates the amplitude of the amplifier output for each frequency input. This characteristic 63 will have a center or tuned frequency $f_1$ for which the amplifier will produce maximum output. The sharpness or broadness of the frequency characteristic 63 can be selected or adjusted in well-known ways by the alignment of the various tuned circuits in the intermediate frequency amplifier 35. Fig. 6 also illustrates the output of the discriminator as a function of the frequency input thereto, assuming a constant amplitude input to the discriminator. Actually, however, the output amplitude of the discriminator will deviate from the value shown by curve 64 in proportion as the amplitude of its input deviates from the fixed value for which curve 64 is drawn. The zero-output frequency or tuned frequency of the discriminator is also chosen to be $f_1$, as illustrated in Fig. 6.

In normal automatic frequency control practice, the frequency of the local oscillator 28, in the absence of any signal from the discriminator, would be adjusted to have a value $f_0$ differing from the transmitted frequency by the amount $f_1$, such adjustment being possible in the present device by operation of voltage divider 53, as already described. In the present instance, however, and according to the present invention, this normal oscillator frequency is purposely adjusted to have a value different from that producing intermediate frequency $f_1$ and is set at a value tending to produce an intermediate frequency such as $f_a$, which is within the linear range of the discriminator characteristic 64 as well as within the acceptance range of amplifier 35, but different from the tuned frequency $f_1$. The oscillator frequency $f_a$, however, will be modified in accordance with the discriminator output and will actually assume some equilibrium value such as $f_t \pm f_b$ at which the oscillator frequency will be substantially constantly maintained by operation of the automatic frequency control system described above.

The wave of intermediate frequency $f_b$ derived from the output of mixer 26 will, however, vary in amplitude because of the amplitude modulation of the signal supplied to mixer 26, as described above with respect to Figs. 4 and 5. The discriminator output will therefore vary correspondingly, so that the discriminator output, instead of being a constant frequency-sensitive voltage, will now be a unidirectional frequency-sensitive voltage varying at the frequency $f_d$. This varying voltage will produce a modulation of the frequency output from oscillator 28 at the same frequency $f_d$. By the operation of mixer 26, this frequency modulation will be superposed on the intermediate frequency wave also. Accordingly, the intermediate frequency input to amplifier 35 will no longer be the constant frequency $f_b$ but will vary periodically on either side of the frequency $f_b$ at the frequency $f_d$. Since the intermediate frequency amplifier characteristic 63 in the region about the value $f_b$ is not horizontal but has a definite slope, this variation of the frequency of the input to amplifier 35 will produce a variation in the amplitude of its output. This output amplitude variation is substantially in phase with the amplitude variation due to the modulation upon the input to mixer 26, and, as a result, a regenerative operation occurs, causing the percentage modulation of the amplitude output from amplifier 35 which actuates indicator 50 to be greatly increased. In effect, through this regenerative action, the circuit operates a sa percentage modulation expander. This modulation expansion renders the present system much more highly sensitive to moving objects than was previously possible, since a greater indication is obtained before the amplifier 35 is overloaded by the leakage energy.

Fig. 7 shows a receiver system similar to that of Fig. 1 and incorporating the principles of the present invention to greater advantage. In the system of Fig. 7, the output of the intermediate frequency amplifier amplitude-modulated in a manner similar to the signal supplied to mixer 26 from antenna 24, is supplied to a detector 73. The output of detector 73 will thus be the audio or modulation signal of the Doppler frequency $f_d$. This signal is passed through a high-pass filter 74 to eliminate all direct current and other undesired components, and is then supplied in series with a biasing voltage derived from source 17 and potentiometer 53 to the reflector 34 of the local oscillator 28, in a manner similar to Fig. 1. This reflector voltage, varying at the frequency $f_d$, causes a corresponding frequency modulation of the output of oscillator 28. By the action of mixer 26 this frequency modulation appears on the intermediate frequency wave; that is, the intermediate frequency wave will vary periodically in frequency at the Doppler frequency $f_d$ and over a frequency range equal to the frequency swing of the output of oscillator 28. This frequency-modulated wave, after amplification in amplifier 35, is then passed through a conventional amplitude limiter 71, and the resulting constant-amplitude frequency-modulated wave is supplied to a conventional frequency discriminator 72, whose output, as is well known, will represent the modulation signal of this frequency-modulated wave; that is, will be the Doppler frequency wave. This output signal may be suitably amplified in amplifier 40' and supplied to indicator 50 as before.

At the same time, the output of frequency discriminator 72 is passed through a low-pass filter 75 which effectively blocks all audio components of this output. The resulting direct current signal derived from the discriminator 72 represents the average deviation of the frequency-modulated intermediate frequency wave from the tuned discriminator frequency. This signal is superposed upon the audio signal output of detector 73, to control oscillator 28, and thereby serves to maintain the average value of the intermediate frequency wave substantially constant by proper adjustment of the local oscillator frequency. It will be seen that in Fig. 7 the functions of modulating the frequency of oscillator 28 and of adjusting its average frequency are separated, while in Fig. 1 these functions are simultaneously performed by the discriminator shown therein.

The great advantage of the present invention can be shown from an illustrative example as applied to Fig. 7. If it be supposed that the output voltage of amplifier 35 is 10 volts, which is a reasonable value, and that it has an amplitude modulation of .01% due to the motion of the object being detected, the alternating current output of the detector 73 will be approximately 1 millivolt at the frequency $f_d$. The frequency sensitivity of an oscillator of the type of oscillator 28 is approximately 8 megacycles frequency for a change of one volt in the reflector voltage. The periodic frequency shift or frequency modulation due to the output of detector 73 will therefore be 8 kilocycles at the frequency $f_d$. The band width of the amplifier 35 may reasonably be chosen as 200 kilocycles, so that the output voltage of the discriminator 72 will be approximatly one-tenth volt per kilocycle of frequency deviation. The frequency modulation of 8 kilocycles impressed on the intermediate frequency wave by the frequency modulation of oscillator 28 will therefore produce an audio output from discriminator 72 having a voltage of approximately $8/10$ volt. Thus, instead of the one millivolt signal which can be produced by detector 73 or which would be obtained in a conventional system, the present system produces a voltage of $8/10$ volt, which is an increase in gain by a factor of 800 without any extra circuits except for amplitude limiter 71. Such a limiter can be incorporated in the last stage of amplifier 35 in well-known manner.

The present system, therefore, serves to effectively increase the percentage modulation of the incoming wave which normally has an extremely low percentage modulation, so that the principles of the present invention are extremely advantageous in warning systems of the type disclosed herein. However, the present invention is not restricted in use to such warning systems but may be used generally to increase the percentage modulation of any modulated wave supplied to mixer 26. It is to be understood also that this invention is not restricted to the use of "reflex klystron" oscillators, such as are illustrated, but that any local oscillator which may be suitably controlled or modulated in the manner set forth in the above specification may be used herein.

As many change could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. An ultra high frequency system, comprising means for transmitting a predetermined frequency, means for receiving energy of said frequency reflected from a distant object, means, including a reflex klystron oscillator having a reflector electrode, for producing a local oscillator frequency, means for mixing said received wave and said local oscillator frequency to produce an intermediate frequency, frequency discriminating means responsive to deviation of said intermediate frequency from a desired value for producing a unidirectional control signal having a polarity corresponding to the sense of said deviation and a magnitude corresponding to the magnitude of said deviation, a source of potential connected to said reflector electrode, means for adjusting said potential to a value producing an output frequency from said local oscillator normally differing from said received frequency by said desired intermediate frequency, means for algebraically adding said adjusted potential and said control signal for controlling the potential of said reflector electrode, and means for selectively reversing the polarity of said control signal whereby said local oscillator frequency may be selectively maintained at a value above or below said received frequency and differing therefrom by said desired intermediate frequency.

2. An ultra high frequency system, comprising means for receiving a radiant energy wave, means, including a reflex klystron oscillator having a reflector electrode, for producing a local oscillator frequency, means for mixing said received wave and said local oscillator frequency to produce an intermediate frequency, frequency discriminating means responsive to deviation of said intermediate frequency from a desired value for producing a unidirectional control signal having a polarity corresponding to the sense of said deviation and a magnitude corresponding to the magnitude of said deviation, a source of potential connected to said reflector electrode, means for adjusting said potential to a value producing an output frequency from said local oscillator normally differing from said received frequency by said desired intermediate frequency, means for algebraically adding said adjusted potential and said control signal for controlling the potential of said reflector electrode, and means for selectively reversing the polarity of said control signal, whereby said local oscillator frequency may be automatically maintained selectively at a value above or below said received frequency and differing therefrom by said desired intermediate frequency.

3. An ultra high frequency system, comprising means for receiving a radiant energy wave, means, including a reflex klystron oscillator having a reflector electrode, for producing a local oscillator frequency, means for mixing said received wave and said oscillator frequency to produce an intermediate frequency, means responsive to deviation of said intermediate frequency from a desired value for producing a unidirectional control signal having a polarity corresponding to the sense of said deviation and a magnitude corresponding to the magnitude of said deviation, a source of potential connected to said reflector electrode, means for adjusting said potential to a value producing an oscillator output frequency normally differing from said received frequency by said desired intermediate frequency, and means for algebraically adding adjusted potential and said control signal for controlling said reflector electrode.

4. An ultra high frequency system, comprising means for receiving a radiant energy wave, means, including a reflex klystron oscillator having a reflector electrode, for producing a local oscillator frequency, means for mixing said received wave and said local oscillator frequency to produce an intermediate frequency, means responsive to deviation of said intermediate frequency from a desired value for producing a unidirectional control signal having a polarity corresponding to the sense of said deviation and a magnitude corresponding to the magnitude of said deviation, means for applying said control signal to said reflector electrode for controlling said oscillator frequency, and means for selectively reversing the polarity of said control signal whereby said local oscillator frequency may be automatically maintained selectively at a value above or below said received frequency and differing therefrom by said desired intermediate frequency.

5. A high frequency warning system for detecting the presence of a moving object, comprising means for radiating a high frequency radiant energy wave, means for receiving said wave after reflection from said object combined with energy directly from said radiating means, a local oscillator producing a local oscillator wave, means for mixing said local oscillator wave and said combined received wave to produce an intermediate frequency wave, amplifier means tuned to a predetermined frequency for amplifying said intermediate frequency wave, indicator means actuated by said intermediate frequency wave, and means for increasing the sensitivity of said system, comprising a frequency discriminator energized by said intermediate frequency wave for producing a control signal corresponding to deviation of said intermediate frequency wave from said predetermined frequency and detector means responsive to said amplifier output to produce a control signal proportional to the amplitude variation thereof, and means for controlling the frequency of said local oscillator by said control signals, said predetermined frequency being slightly different from the frequency of said local oscillator in the absence of discriminator signal, whereby the percentage modulation of said intermediate frequency wave is increased by regenerative action, producing more sensitive indications for detecting moving objects.

6. High frequency apparatus comprising means for receiving an amplitude modulated wave, a source of waves of local oscillator frequency, means for mixing said received wave and said local oscillator wave for producing a correspondingly modulated intermediate frequency wave, and means for increasing the percentage modulation of said intermediate frequency wave, comprising tuned amplifier means having a normal tuned frequency for amplifying said intermediate frequency wave, frequency-sensitive means energized by said amplified intermediate frequency wave for producing a control signal corresponding to deviation of said intermediate frequency wave from said tuned frequency amplitude sensitive means energized by said intermediate frequency wave and producing therefrom an alternating control signal corresponding to the amplitude variation of said intermediate frequency, and means for controlling said local oscillator wave source by said control signals in a direction to restore said intermediate frequency wave to said tuned frequency, said local oscillator frequency being adjusted in the absence of control signal to have a value different from said tuned frequency, whereby the output of said intermediate frequency amplifying means will have increased percentage modulation.

7. High frequency apparatus comprising a source of amplitude modulated high frequency signal, and means for increasing the percentage modulation of said signal, comprising means for amplifying said signal and having a tuned frequency different from the normal average frequency value of said signal, means responsive both to deviation in the frequency of said signal from said tuned frequency and variation in the amplitude of said signal for producing a control signal, and means for varying said average frequency in accordance with said control signal, whereby the percentage amplitude modulation of the output of said amplifying means is materially increased.

8. A high frequency warning system for indicating the presence of moving objects, comprising means for radiating a high frequency radiant energy wave, means for receiving energy reflected by a moving object and for combining said received energy with energy derived from said radiating means, a local oscillator for producing a wave of local oscillator frequency, means for mixing said combined received wave and said local oscillator wave to produce an intermediate frequency wave, means for detecting said intermediate frequency wave and producing therefrom an alternating control signal corresponding to the amplitude variation of said combined wave, means for modulating the frequency of said local oscillator by said alternating control signal to produce a corresponding frequency modulation of said intermediate frequency wave, means for detecting said latter frequency modulation, and means for indicating said detected frequency modulation to indicate the presence of said moving object.

9. Apparatus as in claim 8, further comprising means responsive to deviation of the average frequency of said frequency-modulated wave from a desired frequency value for modifying the average frequency of said local oscillator wave to restore said frequency-modulated wave to its desired average frequency value.

10. High frequency apparatus, comprising a source of amplitude-modulated wave, a beating oscillator for producing a wave of beating frequency, means for mixing said modulated wave and said beating frequency wave to produce a modulated difference-frequency wave, means responsive to the amplitude variations of said difference frequency wave for frequency modulating said beating oscillator, and means for detecting the frequency variations of said difference frequency wave.

11. Apparatus as in claim 10, further including means responsive to the average frequency of said frequency-modulated difference wave for maintaining said average frequency at a predetermined value.

12. High-frequency apparatus comprising a source of amplitude-modulated wave, an oscillator for producing a signal of frequency different from the frequency of said amplitude-modulated wave, means for mixing said amplitude-modulated wave with said oscillator signal to produce a beat frequency wave of frequency equal to the difference between the frequencies of said amplitude-modulated wave and said oscillator signal, means for frequency modulating said oscillator signal in accordance with amplitude variations of said amplitude-modulated wave, and means for detecting the resulting frequency variations in said beat frequency wave.

13. High-frequency apparatus, comprising a source of amplitude-modulated wave, means for detecting said wave, means responsive to said detected wave for modulating the frequency of said modulated wave, and means for detecting said frequency modulation to produce an increased indication of the original modulation of said modulated wave.

14. Apparatus as in claim 13, further including means responsive to said latter detected wave for controlling the average frequency of said original wave.

15. High-frequency apparatus comprising a source of amplitude-modulated wave, means responsive to the amplitude variations of said wave for producing corresponding frequency modulation of said wave, and indicator means responsive to said frequency modulation, whereby said apparatus is rendered more sensitive to said amplitude modulation.

16. The method of detecting an amplitude-modulated wave comprising detecting the amplitude variations of said wave, frequency modulating said wave in accordance with said amplitude variations, and detecting the frequency variations of said wave.

17. The method of detecting an amplitude-modulated wave comprising the steps of generating a beating frequency wave, mixing said modulated wave and said beating wave to produce an intermediate frequency wave, detecting amplitude variations of said intermediate frequency wave, frequency modulating said beating wave in accordance with said amplitude variations, and detecting the resulting frequency variations of said intermediate frequency wave.

18. The method of changing the percentage modulation of an amplitude-modulated wave comprising detecting amplitude variations of said wave, frequency modulating said wave in accordance with said amplitude variations, and passing said frequency-varied wave through a frequency-sensitive circuit producing different output amplitudes for different input frequencies.

19. High-frequency apparatus, comprising a source of amplitude-modulated wave, a beating oscillator for producing a wave of beating frequency, means for mixing said modulated wave and said beating frequency wave to produce a modulated difference-frequency wave, means responsive to the amplitude variations of said difference frequency wave for frequency modulating said beating oscillator, means for detecting the frequency variations of said difference frequency wave, and means for indicating the amplitude of said detected frequency variations.

20. High-frequency apparatus, comprising a source of amplitude-modulated wave, an oscillator for producing a signal of frequency different from the frequency of said amplitude-modulated wave, means for mixing said amplitude-modulated wave with said oscillator signal to produce a beat frequency wave of frequency equal to the difference between the frequencies of said amplitude-modulated wave and said oscillator signal, amplifier means for amplifying said amplitude-modulated beat frequency wave, means for frequency modulating said oscillator signal with the amplitude variations of said amplified beat frequency wave, and means for detecting the resulting frequency variations in said beat frequency wave.

EDWIN T. JAYNES.

REFERENCES CITED

The following references are of record in the file of this patent:

UNITED STATES PATENTS

| Number | Name | Date |
|---|---|---|
| 2,060,142 | Urtel et al. | Nov. 10, 1936 |
| 2,151,323 | Hollmann | Mar. 21, 1939 |
| 2,189,549 | Hershberger | Feb. 6, 1940 |
| 2,206,695 | Guanella | July 2, 1940 |
| 2,223,224 | Newhouse | Nov. 26, 1940 |
| 2,233,777 | Foster | Mar. 4, 1941 |
| 2,245,627 | Varian | June 17, 1941 |
| 2,259,000 | Nyquist | Oct. 14, 1941 |
| 2,273,110 | Kimball et al. | Feb. 17, 1942 |
| 2,332,540 | Travis | Oct. 26, 1943 |
| 2,337,214 | Tunick | Dec. 21, 1943 |
| 2,351,191 | Crosby | June 13, 1944 |
| 2,357,975 | Roberts | Sept. 12, 1944 |
| 2,377,326 | Crosby | June 5, 1945 |
| 2,383,359 | Ziegler | Aug. 21, 1945 |
| 2,433,350 | Earp | Dec. 30, 1947 |